United States Patent
Salmon-Legagneur et al.

(10) Patent No.: US 10,020,944 B2
(45) Date of Patent: Jul. 10, 2018

(54) DEVICE AND METHOD FOR DISCONTINUOUS HASHING OF DIGITAL DATA

(71) Applicant: THOMSON LICENSING, Issy les Moulineaux (FR)

(72) Inventors: Charles Salmon-Legagneur, Rennes (FR); Mohamed Karroumi, Rennes (FR)

(73) Assignee: THOMSON Licensing, Issy-les-Moulineaux (FR)

( * ) Notice: Subject to any disclaimer, the term of this patent is extended or adjusted under 35 U.S.C. 154(b) by 0 days.

(21) Appl. No.: 15/283,744

(22) Filed: Oct. 3, 2016

(65) Prior Publication Data

US 2017/0099147 A1    Apr. 6, 2017

(30) Foreign Application Priority Data

Oct. 6, 2015 (EP) .................................... 15306574

(51) Int. Cl.
*H04L 9/32* (2006.01)
*H04L 9/06* (2006.01)

(52) U.S. Cl.
CPC .......... *H04L 9/3242* (2013.01); *H04L 9/0643* (2013.01)

(58) Field of Classification Search
CPC ..... H04L 9/3242; H04L 9/0643; G06F 12/00; G06F 17/30
See application file for complete search history.

(56) References Cited

U.S. PATENT DOCUMENTS

| 8,655,919 | B2 | 2/2014 | Cachin et al. |
| 2009/0037491 | A1* | 2/2009 | Cachin ................. G06F 21/64 |
| 2012/0096564 | A1* | 4/2012 | Li ......................... G06F 21/64 726/26 |
| 2015/0110264 | A1 | 4/2015 | Wu |

FOREIGN PATENT DOCUMENTS

| EP | 2168304 | 1/2009 |
| WO | WO2009013420 | 1/2009 |

OTHER PUBLICATIONS

Anonymous, "Arxan", http://www.arxan.com/products/guard-technology/, Jan. 1, 2014, pp. 1-2.
Quist, "Covert Debugging Circumventing Software Armoring Techniques", 2007 Black Hat Conference, Las Vegas, Nevada, USA, Jul. 28, 2007, pp. 1-6.

* cited by examiner

*Primary Examiner* — Wasika Nipa
(74) *Attorney, Agent, or Firm* — Brian J. Dorini; Jeffrey M. Navon

(57) ABSTRACT

A cryptographic hash value is computed in a hardware processing unit of an apparatus. The cryptographic hash value is computed iteratively processing blocks of data in a predetermined order by, for each block: obtaining at least one intermediate value for the block by applying a function to the block, computing a value of a weight function, and updating at least one hash variable with a corresponding intermediate value only if the value of a weight function is equal to at least one predetermined value. The processing unit then generates the cryptographic hash value from the at least one hash variable.

12 Claims, 3 Drawing Sheets

DEVICE AND METHOD FOR DISCONTINUOUS HASHING OF DIGITAL DATA

REFERENCE TO RELATED EUROPEAN APPLICATION

This application claims priority from European Application No. 15306574.3, entitled, "Device and Method for Discontinuous Hashing of Digital Data" filed on Oct. 6, 2015, the contents of which are hereby incorporated by reference in its entirety.

TECHNICAL FIELD

The present disclosure relates generally to cryptography and in particular to hashing of digital data.

BACKGROUND

This section is intended to introduce the reader to various aspects of art, which may be related to various aspects of the present disclosure that are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

The integrity of digital data can be verified using different cryptographic hash techniques such as SHA-1 and MD5. These hash techniques process an input string of arbitrary length by dividing it into blocks that are processed iteratively until a final hash value is obtained.

For example, SHA-1 outputs a 20-byte hash value (also called checksum or digest depending on the technical area) for a string of any input length. The input string or message is padded to obtain a length that is a multiple of 64 bytes. SHA-1 then uses a compression function as follows:

1—Five hash variables (U, V, X, Y, Z) are initiated to the specific constants defined in the standard FIPS 180-4.

2—For each 64-byte block of N blocks of an input message M, the algorithm applies the compression function F to an input block Mi, determining five 4-byte intermediate variables ($A=a_i$, $B=b_i$, $C=c_i$, $D=d_i$, $E=e_i$) for each block.

3—The five hash variables (U, V, X, Y, Z) contain hash blocks computed for message block Mi and are updated as follows:

$$(U,V,X,Y,Z) \leftarrow F(Mi,(U,V,X,Y,Z)) + (U,V,X,Y,Z) = (A,B,C,D,E) + (U,V,X,Y,Z)$$

Hence:

$$(U=u_i, V=v_i, X=x_i, Y=y_i, Z=z_i) \leftarrow (u_{i-1}+a_i, v_{i-1}+b_i, x_{i-1}+c_i, y_{i-1}+d_i, z_{i-1}+e_i) \text{ where + is an addition modulo } 2^{32}$$

4—After repeating step 3 N times, the concatenation U|V|X|Y|Z is output as the resulting 20-byte message digest.

The compression function F works as follows:

1—Expand the 64-byte block B into 80 words $M_j$ of 4 bytes.

2—Copy values of ($U=u_{i-1}$, $V=v_{i-1}$, $X=x_{i-1}$, $Y=y_{i-1}$, $Z=z_{i-1}$) in intermediate variables (A, B, C, D, E)
(A, B, C, D, E) ← (U, V, X, Y, Z)

3—Perform 80 rounds (for j=0 to 79) of:
(A, B, C, D, E) ← ($M_j$+rot$_5$(A)+g(B, C, D)+E+$K_j$, A, rot$_{30}$(B), C, D)

where rot$_n$ denotes left rotation by n bits, $K_j$ are constants and the function g depends on the round number:

$g(R,S,T) = (R\&S)^\wedge(\overline{R}\&T)$ for $j$ in $\{0 \ldots 19\}$ $g(R,S,T) = R \oplus S \oplus T$ for $j$ in $\{20 \ldots 39\}, \{60 \ldots 79\}$ $g(R,S,T) = (R\&S)^\wedge(R\&T)^\wedge(S\&T)$ for $j$ in $\{40 \ldots 59\}$ where $\overline{\phantom{x}}, \&, {}^\wedge$ and $\oplus$ denote the Boolean operators NOT, AND, OR and Exclusive OR. The digital data to be verified can be the computer code of a software application. This can ensure that the code executed by a processor has not been tampered with.

The process of protecting the integrity of the software application is commonly applied to the binary code once the code has been compiled. A post-build tool computes the checksum of a selected region within the binary and inserts the checksum reference value inside the binary. The checksum reference value cannot be included in the selected region as its presence impact the checksum of the selected region. Therefore, selected regions and checksum reference values are located apart; for example, selected regions are in the CODE sections, and checksum values are inserted into the DATA section.

In this example, the code region is protected by integrity, whereas regions containing checksums reference values (e.g., the DATA section) are vulnerable to tampering. To improve the protection, it is common to deploy multiple integrity verifications and to spread checksums reference values throughout the binary. The assumption of a continuous region of data on which the integrity can be computed is then no more valid, because regions, which can be overlapping, contain checksums of other blocks inserted at post-build time.

FIG. 1 illustrates a section of code with two overlapping regions and checksum reference values according to the prior art. The section of code 100 comprises two regions, region O 112 and region P 114, two checksum reference values, checksum O 124 and checksum P 122, and a key 132. As can be seen, region O comprises checksum O and checksum P, while region P comprises checksum O and the key. This means that the integrity for region O should be generated over the whole region minus checksum O and checksum P. Likewise, the integrity for region P should be generated over the whole region minus checksum O and the key. As the checksums and, often, the key are introduced after the checksum calculations, it is necessary to discard the inserted checksums and the key in subsequent checksum calculations.

Many existing commercial products offer integrity protection. Protecting an application using such products usually requires the interaction of a skilled person, who must define a specific script to protect the application. To solve the discontinuity issue in protected regions, the security expert should declare a list of excluded regions, which are subtracted from the protected region when the integrity check is performed. This means that the binary must embed a table of information that describes locations to exclude, which in itself leaks information to an attacker that is then able to list the potential locations where sensitive information and secrets can be stored.

In addition, even if the information itself (the perimeter of the protection regions, start address, length, the value of the checksum, etc.) does not contain any confidential or sensitive data, it nevertheless presents a weakness that can be exploited by a dynamic attack. With a debugger, an attacker can put hardware breakpoints on the checksum location and monitor read/write accesses to it. This way, it is easy to detect the calling integrity routines and their invocation points in order to stub them.

Today, advanced temporal monitoring tools use new, advanced technologies, like hypervisors or virtual machines to track the application stealthily, i.e., the read/write memory accesses of each function. In the previous example, the integrity routine makes no read access to the excluded locations, which renders an oracle attack possible. Each non-read address becomes suspicious and gives a hint as to where to find sensitive information such as information inserted at post-build time.

It will be appreciated that it is desired to have a solution that overcomes at least part of the prior art problems related to integrity of digital data, in particular in software applications. The present principles provide such a solution.

SUMMARY OF DISCLOSURE

In a first aspect, the present principles are directed to an apparatus for computing a cryptographic hash value. The device comprises a hardware processing unit configured to iteratively process blocks of data over which the cryptographic hash value is to be computed in a given order, where the data comprises at least one block that shall not have an impact on the cryptographic hash value; for each block: obtain at least one first value for the block by processing the block, compute a second value based on the block that indicates whether or not the block should impact the cryptographic hash value, and update at least one register with a third value corresponding to the first value only if the second value indicates that the block should impact the cryptographic hash value; and generate the cryptographic hash value from the at least one register. The device further comprises an interface configured to at least one of: receive the data over which the cryptographic hash value is to be computed and to output the cryptographic hash value.

Various embodiments of the first aspect include:

That the processor is further configured to use the cryptographic hash value for further calculations, That the second value can be equal to 0 or 1 and that the processor is configured to update the at least one register by adding a product of the second value and the third value to the register. The second value can depend on whether or not an offset of the block is in a list of block offsets. The second value can also depend on whether or not the first value is included in a set of reference values for the block.

In a second aspect, the present principles are directed to a method for computing a cryptographic hash value. A hardware processing unit of an apparatus obtains data over which the cryptographic hash value is to be computed, the data comprising at least one block that shall not have an impact on the cryptographic hash value; iteratively processes blocks of data in a given order by, for each block: obtaining at least one first value for the block by processing the block, computing a second value based on the block that indicates whether or not the block should impact the cryptographic hash value, and updating at least one register with a third value corresponding to the first value only if the second value indicates that the block should impact the cryptographic hash value; and generates the cryptographic hash value from the at least one hash variable.

Various embodiments of the second aspect include:

That the processor is further configured to use the cryptographic hash value for further calculations, That the second value can be equal to 0 or 1 and that the processor is configured to update the at least one register by adding a product of the second value and the third value to the register. The second value can depend on whether or not an offset of the block is in a list of block offsets. The second value can also depend on whether or not the first value is included in a set of reference values for the block.

That the processing unit further pads the data so that a length of the data is a multiple of a length of the blocks.

That the processing unit initializes the at least one register.

That the data is obtained from a further device via an interface.

In a third aspect, the present principles are directed to a computer program product which is stored on a non-transitory computer readable medium and comprises program code instructions executable by a processor for implementing the steps of a method according to any embodiment of the second aspect.

BRIEF DESCRIPTION OF DRAWINGS

Preferred features of the present principles will now be described, by way of non-limiting example, with reference to the accompanying drawings, in which.

DESCRIPTION OF EMBODIMENTS

Figure 1:
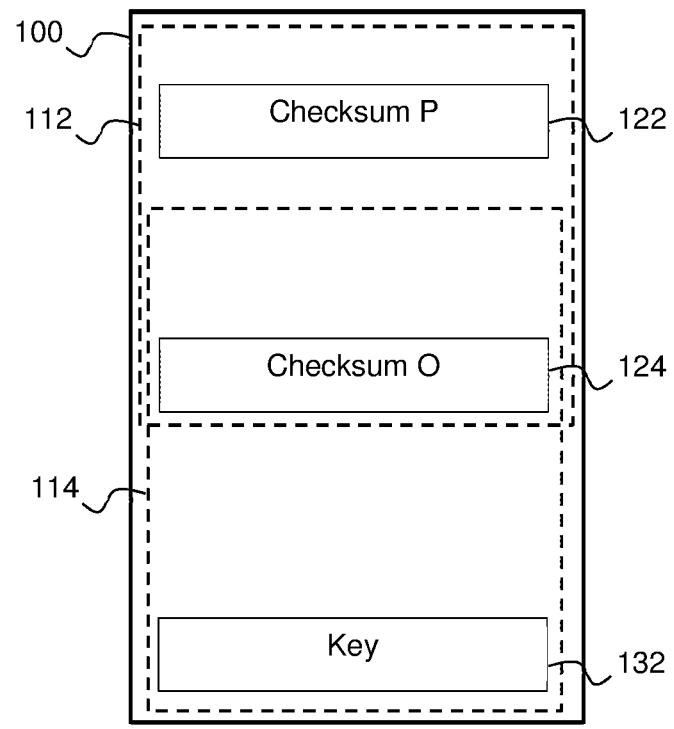
FIG. 1 illustrates a section of code with two overlapping regions and checksum reference values according to the prior art.
Figure 2:
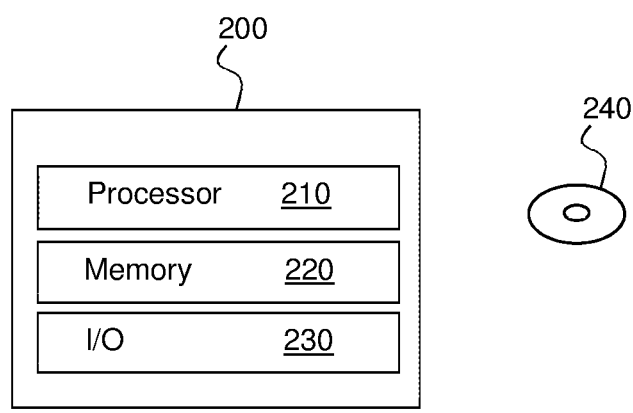
FIG. 2 illustrates an apparatus for generating a checksum for digital data according to the present principles.

FIG. 2 illustrates an apparatus 200 for generating a checksum for digital data according to the present principles. The device 200 comprises at least one hardware processing unit ("processor") 210, memory 220 and at least one communications interface 230 configured to communicate with other devices. The skilled person will appreciate that the illustrated device is very simplified for reasons of clarity and that real devices in addition would comprise features such as internal connections and power supplies. A non-transitory storage media 240 stores instructions that, when executed by a processor (such as processor 210), generate a checksum for digital data as further described hereinafter.

A general idea of the present principles is to apply the integrity verification to the entire input data, such as (a region of) software code, without making any assumptions as to whether or not it comprises excluded areas. On the other hand, the integrity verification mechanism is modified so that the bytes of an excluded area have no impact on the final integrity value.

The nature of the modification depends on the type of integrity function l( ) used. An aspect of present principles are directed to when l( ) is a one-way function such as SHA-1 or MD5 and the input data is iteratively processed block by block. In this case, the integrity function l( ) is modified internally to incorporate a weight function. The weight function is designed so that it is computationally difficult to find the location of an excluded area knowing the weight function, as will be described hereinafter.

The hash function of the present principles thus always performs a hash operation for each area. Continuing with SHA-1 as a non-limitative example, this gives the following hash function.

Steps 1, 2 and 4 of the prior art SHA-1 algorithm are kept the same, only step 3 is modified.

In a preferred embodiment, modified step 3 comprises:

$$(U,V,X,Y,Z) \leftarrow W(i)*F(Mi,(U,V,X,Y,Z))+(U,V,X,Y,Z)$$

$W(i)$ denotes a weight function defined so that $W(i)$ is equal to:
- 0 if block i is a reserved region (and thus should be excluded from the integrity computation), and
- 1 otherwise.

Finally, the concatenation $U|V|X|Y|Z$ is output as the resulting 20-byte message digest.

In a variant embodiment, two sets of 5 variables, i.e. (U, V, X, Y, Z) [0] and (U, V, X, Y, Z) [1] are used and step 3 is modified as follows:

$$(U,V,X,Y,Z)[W(i)] \leftarrow F(Mi,(U,V,X,Y,Z))+(U,V,X,Y,Z)$$
$$[W(i)]$$

Intermediate hash blocks of non-excluded area are stored in (U, V, X, Y, Z) [1] whereas intermediate hash blocks of excluded area are stored in (U, V, X, Y, Z) [0]. After processing the last block $B_N$, $U[1]|V[1]|X[1]|Y[1]|Z[1]$ is output as the resulting 20-byte message digest.

An example of weight function is to use a list L of block offsets and then define $W(i)=0$, if i is in L, and $W(i)=1$ otherwise. The list L must be available during the hash verification.

Preferably, the weight function is designed not to reveal the list L of block offsets. In other words, an attacker should preferably not be able to easily find the pre-image of $W^{-1}(0)$, i.e. the list of reserved regions. To hide the list of reserved regions, a solution is to compare an encrypted offset of an excluded region against a reference value instead of comparing the region offset itself.

Another way of achieving this is to generate a list L' of references values. These references values are the results of $F(M_j, \ldots)=(a_j, b_j, c_j, d_j, e_j)$ where j is the offset of a reserved region. The list L' is for example added to binary code and during hash verification it is checked whether the current results of the compressed function $F(Mi, \ldots)=(a_i, b_i, c_i, d_i, e_i)$ in step i is present in the list L' of references values. The new weight function uses the list L' and is defined as $W(i)=0$, if $F(Mi, \ldots)=(a_i, b_i, c_i, d_i, e_i)$ is in L', and $W(i)=1$ otherwise. $F(.)$ is the SHA-1 compression function which is a one-way function. The results of the one-way function are compared, rather than the offsets. This comparison avoids revealing the offsets of the reserved regions. Memory space may be saved by storing a combination of the five intermediate values, for example $Q=a_j+b_j+c_j+d_j+e_j$ instead of $(a_j, b_j, c_j, d_j, e_j)$. The addition can be replaced or mixed with other operations. In addition, the list L' may contain additional random or dummy values in order to hide the total number of reserved regions. For example, if there are 10 reserved regions in the list $L'=\{Q_0, \ldots, Q_9\}$, the list can be inflated up to, for example, 100 values (10 reference values+90 dummy values), i.e. $L'=\{Q_0, Q_1, \ldots, Q_{99}\}$.

Figure 3:
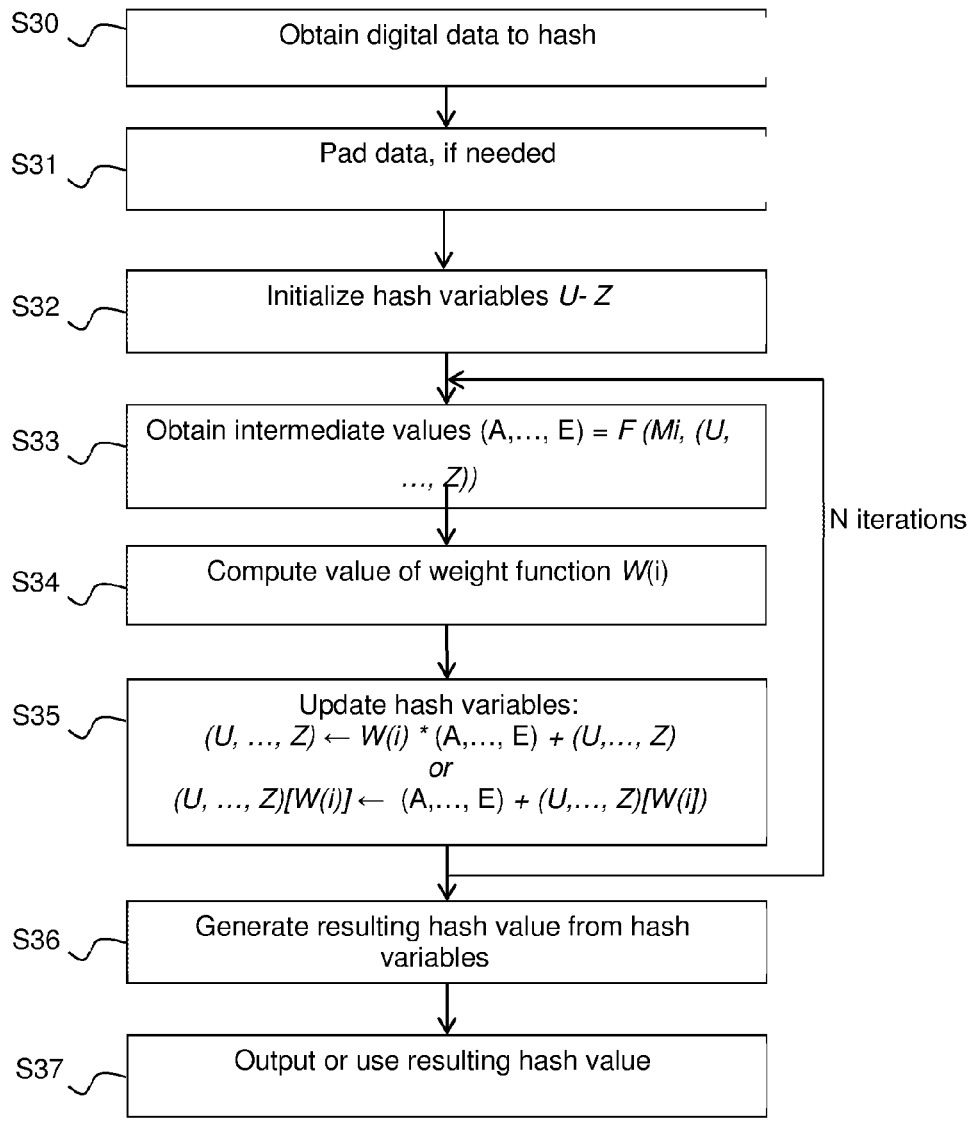
FIG. 3 illustrates a method for hashing digital data according to the present principles.

FIG. 3 illustrates a method for hashing digital data according to the present principles. In step S30, an apparatus, such as the device 200, obtains the digital data that will be hashed. The digital data can be received from an external device or can be generated internally. The data may be optionally padded, in step S31, in order for the date to be a multiple of 64 bytes. The five hash variables U-Z are initialized in step S32. N iterations may be performed of steps S33, S34 and S35. Step S33 may include updating the intermediate variables $(A, \ldots, E)=F(Mi, (U, V, X, Y, Z))$. In step S34, the value of the weight function $W(i)$ may be determined for a present block (i.e., Mi), i.e. $W(i)=0$, if $A+B+C+D+E$ is in L', and $W(i)=1$ otherwise. Step S35 may determine the new values of the hash variables U-Z, i.e. $(U, V, X, Y, Z) \leftarrow W(i)*(A, B, C, D, E)+(U, V, X, Y, Z)$ according to the preferred embodiment or $(U, V, X, Y, Z) [W(i)] \leftarrow (A, B, C, D, E)+(U, V, X, Y, Z) [W(i)]$ according to the variant embodiment. In step S36, a resulting hash value may be generated by concatenation of the hash blocks. In step S37, the resulting hash value may be output or used. For example, in step S35, the resulting hash value may be output to a further device or may be used for further internal calculations (such as for encryption, comparison with a reference checksum value, or generation or verification of a digital signature). The steps S31-37 may be performed by the apparatus or device 200 described in FIG. 2, including a combination of the processor 210 and memory 220 of FIG. 2.

Figure 4:
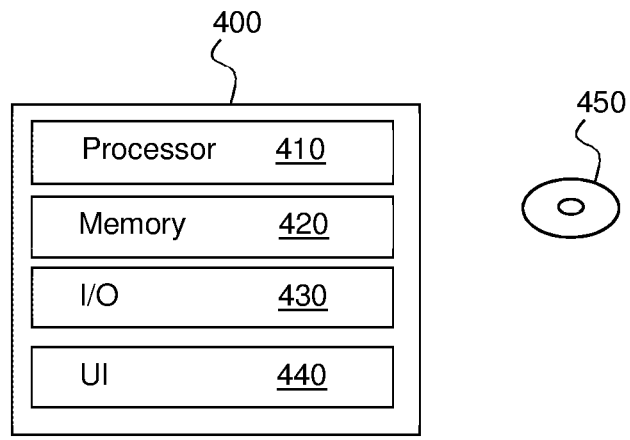
FIG. 4 illustrates a post-build tool apparatus 400 for protecting software code according to the present principles.

FIG. 4 illustrates a post-build tool apparatus 400 for protecting software code according to the present principles. The post-build tool 400 comprises at least one hardware processing unit ("processor") 410, memory 420, at least one communications interface (I/O) 430 configured to communicate with other devices and a user interface (UI) 440. The skilled person will appreciate that the illustrated post-build tool is very simplified for reasons of clarity and that real devices in addition would comprise features such as internal connections and power supplies. A non-transitory storage media 450 stores instructions that, when executed by a processor (such as processor 410), protect software code as further described hereinafter.

The post-build tool 400 may be configured to perform processes and/or methods that modify a binary of the application to protect. As soon as the number of reserved regions, their position or their content are altered, the intermediates values of the compression function are also modified, which should be taken into account by the weight function.

To reserve areas for the excluded regions, the source code is first modified. A classical method consists in calling macros that insert dead code instructions. This permits reservation of room in which data can be inserted at post-build time.

Figure 5:
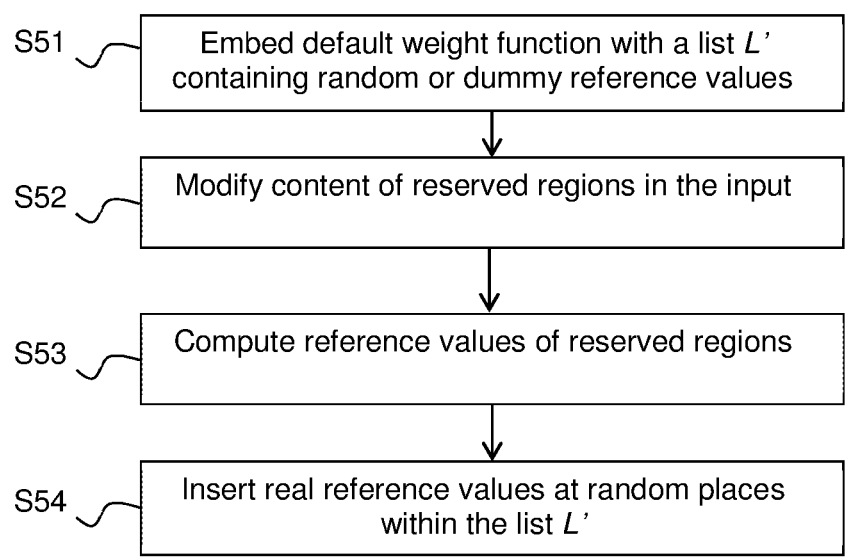
FIG. 5 illustrates an example of the protection method.

FIG. 5 illustrates an example of the protection method (i.e. modification of the verification code).

In step S51, a default weight function $W(.)$ may be embedded, in the modified integrity function, with a list of references values $L'=\{R_1; \ldots; R_k\}$ containing k random or dummy values.

In step S52, the content of one or more reserved regions may be modified. The added data may advantageously be secret and specific to one or a few instances of the binary.

In step S53, the list of/references values $L'=\{Q_1, \ldots, Q_l\}$ may be determined for all reserved regions by calculating the 'normal' intermediate value $(A=a_j, B=b_j, C=c_j, D=d_j, E=e_j)$ for each block Mi belonging to the reserved regions and then, if using the trick to save memory, $Q=a_j+b_j+c_j+d_j+e_j$.

In step S54, the references values computed in step S53 may be inserted at a random location within the list L'. The list L' contains at the end l-k values.

The steps S51-S54 may be performed by the apparatus or device 400 described in FIG. 4, including a combination of the processor 410 and memory 420 of FIG. 4.

The skilled person will appreciate that while the present principles have been described using SHA-1 as an example, they can easily be generalised to other cryptographic hash functions that accumulate intermediate values on blocks, such as for example SHA-256, SHA-512 and SHA-3.

It will thus be appreciated that the present principles provide a solution for discontinuous hashing of digital data.

Each feature disclosed in the description and (where appropriate) the claims and drawings may be provided independently or in any appropriate combination. Features described as being implemented in hardware may also be implemented in software, and vice versa. Reference numerals appearing in the claims are by way of illustration only and shall have no limiting effect on the scope of the claims.

The invention claimed is:

1. An apparatus for computing a cryptographic hash value, comprising:
a hardware processing unit configured to:
iteratively process blocks of data over which the cryptographic hash value is to be computed in a given order, where the blocks of data comprises at least one block of data that shall not have an impact on the cryptographic hash value;
for each block of data:
obtain at least one first value for the each block of data by processing the each block of data;
compute a second value based on the each block of data that indicates whether or not the each block of data should impact the cryptographic hash value; and
update at least one register with a third value corresponding to the first value only if the second value indicates that the each block of data should impact the cryptographic hash value; and
generate the cryptographic hash value from the at least one register; and
an interface configured to at least one of: receive the blocks of data over which the cryptographic hash value is to be computed and to output the cryptographic hash value,
wherein the second value can be equal to 0 or 1 and wherein the hardware processing unit is configured to update the at least one register by adding a product of the second value and the third value to the at least one register.

2. The apparatus of claim 1, wherein the processor hardware processing unit is further configured to use the cryptographic hash value for further calculations.

3. The apparatus of claim 1, wherein the second value is dependent on whether or not an offset of the each block of data is in a list of block offsets.

4. The apparatus of claim 1, wherein the second value is dependent on whether or not the first value is included in a set of reference values for the each block of data.

5. A method for computing a cryptographic hash value, the method comprising in a hardware processing unit of an apparatus:
obtaining data over which the cryptographic hash value is to be computed, the data comprising at least one block of data that shall not have an impact on the cryptographic hash value;
iteratively processing blocks of data in a given order, for each block of data, by:
obtaining at least one first value for the each block of data by processing the each block of data;
computing a second value based on the each block of data that indicates whether or not the each block of data should impact the cryptographic hash value; and
updating at least one register with a third value corresponding to the first value only if the second value indicates that the each block of data should impact the cryptographic hash value; and
generating the cryptographic hash value from the at least one hash variable,
wherein the second value can be equal to 0 or 1 and wherein the at least one register is updated by adding a product of the second value and the third value to the at least one register.

6. The method of claim 5 further comprising outputting or using the cryptographic hash value for further calculations.

7. The method of claim 5, wherein the second value is dependent on whether or not an offset of the each block of data is in a list of block offsets.

8. The method of claim 5, wherein the second value is dependent on whether or not the first value is included in a set of reference values for the each block of data.

9. The method of claim 5, further comprising padding the data so that a length of the data is a multiple of a length of the blocks of data.

10. The method of claim 5, further comprising initializing the at least one register.

11. The method of claim 5, wherein the data is obtained from a further device via an interface.

12. Computer program product which is stored on a non-transitory computer readable medium and comprises program code instructions executable by a processor for implementing the steps of a method for computing a cryptographic hash value comprising:
obtaining data over which the cryptographic hash value is to be computed, the data comprising at least one block of data that shall not have an impact on the cryptographic hash value;
iteratively processing blocks of data in a given order, for each block of data, by:
obtaining at least one first value for the each block of data by processing the each block of data;
computing a second value based on the each block of data that indicates whether or not the each block of data should impact the cryptographic hash value; and
updating at least one register with a third value corresponding to the first value only if the second value indicates that the each block of data should impact the cryptographic hash value; and
generating the cryptographic hash value from the at least one hash variable,
wherein the second value can be equal to 0 or 1 and wherein the at least one register is updated by adding a product of the second value and the third value to the at least one register.

* * * * *